United States Patent Office 3,478,025
Patented Nov. 11, 1969

3,478,025
POLYMERIZATION OF LACTAMS
John M. Kolyer, Convent, and Albert A. Kvlglis, Clifton, N.J., assignors to Allied Chemical Corporation, New York, N.Y., a corporation of New York
No Drawing. Original application May 19, 1965, Ser. No. 457,173. Divided and this application Oct. 16, 1968, Ser. No. 782,782
Int. Cl. C07d 55/50; C08g 33/08
U.S. Cl. 260—248                                4 Claims

ABSTRACT OF THE DISCLOSURE

Process for anionic polymerization of lactams such as epsilon-caprolactam utilizing a metal catalyst and a (p-substituted phenylthio)-s-triazine promoter such as tris-(p-chlorophenylthio)-s-triazine, tris-(p-tertiarybutylphenylthio)-s-triazine, tris-(p-cresylthio)-s-triazine, or tris-(p-bromophenylthio)-s-triazine.

CROSS REFERENCE TO RELATED APPLICATION

This application is a division of co-pending application Ser. No. 457,173 filed May 19, 1965.

This invention relates to process for polymerization of higher lactams especially lactams having at least one ring formed by one imide group and 5 to 11 methylene groups. More particularly the subject process is one of anionic polymerization wherein a novel class of polymerization promoters is used, which afford rapid polymerization rate even after storage at elevated temperature and produce polymer having good color and good stability to light including ultraviolet light.

Anionic polymerization of lactams having at least 7 ring atoms can be promoted by use of certain triazine compounds, for example those disclosed in copending U.S. application of Pietrusza et al., Ser. No. 146,449 filed Oct. 20, 1961. Among the most effective of the triazine promoters disclosed in the cited application is triphenoxy-s-triazine. We have found that a problem arising when this promoter is used e.g. for ε-caprolactam polymerization is that the resulting polymer, although initially an off-white or ivory color, turns yellow upon exposure to ultraviolet light.

In accordance with this invention we obtain lactam polymers of good color which are stable to ultraviolet light by anionically polymerizing a higher lactam, i.e. a lactam having at least one saturated ring consisting of at least one imide group and at least 5 additional ring atoms all of the ring atoms other than the imido nitrogens being carbon atoms; and supplying in the reaction mixture, as promoter, a (p-substituted phenylthio)-s-triazine the p-substituent upon the phenyl ring being of the group consisting of halo and lower alkyl.

Lactams especially preferred for polymerization in accordance with our process are omega-lactams having a single ring, said lactam consisting of one imide group in a ring with 5 to 11 methylene groups; especially ε-caprolactam.

Suitable catalysts of anionic polymerization are well known in the art, represented for example by U.S. Patent 3,015,642 of Jan. 2, 1962 to Schnell et al.; U.S. Patent 3,017,391 of Jan. 16, 1962 to Mottus et al.; U.S. Patent 3,017,392 of Jan. 16, 1962 to Butler et al.; U.S. Patent 3,018,273 of Jan. 23, 1962 to Butler et al.; U.S. Patent 3,141,006 of July 14, 1964 to Kohan, etc. The catalyst is a metal catalyst, e.g. a metal or alloy thereof, or compound thereof; and is sufficiently basic to form a metal iminium salt of the lactam being polymerized. Such catalysts include alkali metals or alloys thereof; alkaline earth metals including magnesium; and basically reacting compounds of said alkali metals or alkaline earth metals such as hydrides, amides, oxides, hydroxides, salts of weak acids such as carbonate salts or weak organic acid salts, metallo organic compounds, etc.

As is known, the metal catalyst used for anionic polymerization tends to react, either in the form in which it is supplied or in the form of its lactam iminium salt, with acidic substances and substances capable of supplying hydrogen to a strong reducing agent. Examples of reactive substances are carbon dioxide, water, acids, and primary amines. Accordingly such reactive substances should be removed from the reaction mixture, and the reaction system during polymerization should be protected from such substances.

The mechanism of the polymerization may involve production of the iminium salt of the lactam by reaction of the lactam with the metal catalyst and also reaction of this iminium salt with one or more of the mercapto or other active groups of our above specified triazine promoters. However we do not intend to be bound by theories as to the principles underlying the improved process of our invention.

In our process, suitable amounts of metal catalyst in the reaction mixture (i.e. amounts supplied over and above any amounts consumed by reactive substances in the mixture other than the lactam) range from about 0.001 to about 10 equivalents of metal per 100 mols of lactam supplied; and suitable amounts of promoter supplied range from about 0.001 to about 10 equivalents of thio groups per 100 mols of lactam supplied. The term "equivalents" is used herein in its ordinary sense to mean the formula weight of the specified metal catalyst divided by the valence of the metal; and the formula weight of the triazine promoter containing mercapto groups divided by the number of mercapto groups in the promoter molecule. Thus for example, one equivalent of our tris-(p-chlorophenylthio)-s-triazine promoter is the formula weight of the promoter viz. 508.5, divided by 3=169.5 parts by weight.

Temperatures suitable for the subject anionic polymerization lie in the range from the melting point of the lactam or mixture of lactams being polymerized to the decomposition temperature of the resulting polymer. To achieve good rates and minimize production of by-products the preferred temperatures are generally in the range from about 100° C. to about 200° C.

The promoters of our invention are the symmetrical triazines containing at least one substituent mercapto group selected from the group consisting of p-halophenylthio and p-$C_1$-$C_8$ alkylphenylthio. Our present view is that the most effective and practical compounds overall, within this class, are tris-(p-chlorophenylthio)-s-triazine and tris-(p-tertiary-butylphenylthio)-s-triazine. The compounds tris-(bromophenylthio)-s-triazine and tri-(p-cresylthio)-s-triazine are also of special interest.

The above named four triazine compounds are new compounds per se.

In addition to containing at least one mercapto group as above specified, our triazine promoters contain such mercapto groups or different substituents at the remaining positions 2-, 4-, and 6- available for attachment of substituents upon the s-triazine ring, i.e. at the carbon atoms of the ring. The broad class of our promoters accordingly is represented by the formula:

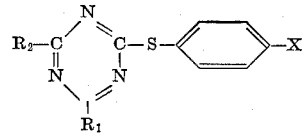

wherein X is halo, especially chloro or bromo-, or is lower alkyl; and $R_1$ and $R_2$ are each independently selected to be the same or similar to the mercapto group just defined; or to be inert groups, inert under the polymerization conditions; or to be active groups differing from the defined mercapto groups and having promoter activity under the polymerization conditions. Examples of suitable groups $R_1$ and $R_2$ are para-halophenylthio, para-lower alkylphenylthio, and other mercapto (i.e. organothio) groups; hydrogen; alkyl; arylalkyl; cycloalkyl; alkenyl; aryl; aryloxy; alkoxy; cycloalkoxy; alkenyloxy; halo; nitro; dialkylamino; etc.

Use of triazine promoters having active promoter groups at each of the three substitutable positions of the triazine ring leads generally to polymers insoluble in metacresol, indicating cross-linking; whereas use of triazine promoters having one or two substituents which are inactive or less active than the above defined mercapto group of the promoter results generally in a more soluble polymer product. Thus it will be seen that polymer properties can be varied by choice of the substituents in the triazine promoter.

Other parameters can also be varied to vary the polymer properties in the usual manner of promoted anionic polymerization, e.g. catalyst and promoter concentrations. Toughness and transparency can be increased by use of mixtures of lactams instead of using only one lactam alone, e.g. mixtures of lactams such as ε-caprolactam-substituted ε-caprolactam such as the methyl-ε-caprolactams, ω-enantholactam, ω-laurolactam, etc. Mixtures of one or more of the above with other lactams can also be polymerized by our process; and the above can be polymerized with other lactams including dilactams, suitable mixtures being e.g. isopropylidene di-ε-caprolactam amounting to 5–25 mol percent of the lactam in the polymerization mixture, with the balance of the lactam being ε-caprolactam and/or ω-enantholactam and/or ω-laurolactam.

The best mode contemplated by us for carrying out our invention can be outlined as follows.

The monomer to be polymerized is well mixed under inert atmosphere above its melting point with anionic catalyst, e.g. in the form of a sodium, a potassium or a lithium salt of a lactam in solution in lactam. This catalyst solution is mixed with our mercapto triazine promoter, suitably in a heated mold or like vessel containing the promoter in molten condition or in solution in lactam. The temperature can be brought to polymerization temperature by heating and/or using preheated dispersions or solutions of each of the ingredients, or a preheated solution of catalyst which is then mixed with promoter. Portionwise addition of promoter to catalyst and lactam will sometimes be preferred to obtain highly linear polymer.

Our process can be used to produce shaped articles by polymerizing lactam in a mold at temperature in the range between the lactam melting point and the polymer melting point, to form directly an article, solid or hollow, of polymerized lactam, reproducing the interior shape of the polymerization zone. In such operations for production of void-free articles, the mixing will usually be accomplished in liquid state below the polymerization temperature, and after escape of any bubbles the polymerization mixture will be heated enough to start the polymerization. Removal of bubbles can be accelerated by rotation of the container or mold, allowing bubbles to escape above the center of rotation. Rotation can then be discontinued, e.g. for production of solid articles; or can be maintained, especially for production of hollow articles. Since there are no volatile by-products to be released the mold can be entirely closed.

A special advantage of tris-mercapto triazine promoters in which all three mercapto groups are of the class of this invention, over triazine promoters such as triphenoxytriazine, is their relatively low melting points, not above 170° C. These melting points assure that the promoters can effectively be added directly to a polymerization reaction mixture without a preliminary step of forming a solution of the promoter. Such low-melting promoters dissolve quickly in these reaction mixtures at the usual reaction temperatures of 160°–180° C.

Solid materials such as reinforcing fibers, fillers, pigments, etc. can advantageously be incorporated in our polymer by dispersion in monomer which is then polymerized by our process, whereby filled articles with improved properties of dimensional stability, toughness, hardness, lubricity, etc. can be formed. Examples of such reinforcing agents, fillers and pigments include sand or silica (up to 75% by weight); carbon black (1% by weight); aluminum filings (up to 50% by weight); glass wool or glass fibers (up to 50% by weight); molybdenum disulfide lubricant powder; barium carbonate azide blowing agent (1–5% by weight) forming a foamed article; etc.

The examples described and tabulated below are illustrative of our invention and describe completely specific embodiments of our invention, but the invention is not to be interpreted as limited by the details or the species of the examples.

The examples were carried out by mixing a catalyst solution, wherein lithium was the catalytic metal, with an equal volume of promoter solution. Each of the promoter solutions contained the same molar concentration of promoter in caprolactam.

The catalyst solution was prepared by reacting 0.12 part of lithium hydride with 100 parts of dry caprolactam under anhydrous conditions at 100° C for 5 hours. The several promoters were prepared by reaction of the sodium salt of the appropriate mercaptan, in aqueous acetone medium, with the stoichiometric amount of cyanuric chloride according to the following equation:

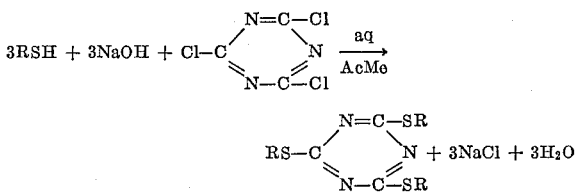

The promoter preparations were carried out by adding the calculated proportion of mercaptan to aqueous sodium hydroxide (20 g. per 400 ml. of water) thus forming the sodium salt of the mercaptan in water; and adding thereto, with stirring, an acetone solution of cyanuric chloride in proportion of 28 g. per 100 ml. of acetone, over the course of about ½ hour; then heating the resulting mixture for about ½–1 hour at 55°–65° C. The product mixture was cooled to room temperature or below, and enough 5% aqueous sodium hydroxide was added to assure alkalinity. The crude product was filtered off, washed with water, and purified by recrystallization as indicated in Table I below.

The properties of our promoters are shown in Table I below.

The promoters were dissolved in caprolactum at concentration of 0.16 mol of promoter per 100 mols of caprolactam. In the initial polymerization reaction mixture, consisting of catalyst solution and promoter solution, the catalyst and promoter amounted respectively to about 0.85 equivalent of metal, and to about 0.24 equivalent of mercapto groups, per 100 mols of caprolactam supplied. The reaction mixtures were heated in polymerization tubes under anhydrous nitrogen in a bath maintained at 160–165° C. The polymerization results obtained with the various promoters are shown in Table II below together with, for comparison, results using triphenoxy-s-triazine under the same conditions.

In the examples, activity was tested by observing (1) the time in minutes when the liquid reaction mixture began to gel; (2) the time in minutes when the liquid reaction mixture started to become cloudy; and (3) the time in minutes when the completely solidified reaction mixture shrank away from the sides of the reaction vessel. These times are indicated in Table II below as gel time, cloud time, and breakaway time.

TABLE I

Tris-mercapto-s-triazine Product: 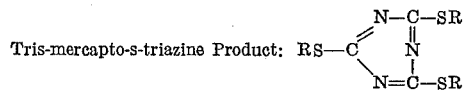

| R Group of Mercaptan Used | Mols, Mercaptan | Mols, NaOH | Mols (CNCl)$_3$ | Crude Yield Percent of Theory | Purification | M.P., °C. Sealed Capillary | Yield After Purification |
|---|---|---|---|---|---|---|---|
| p-Cresyl | 0.3 | 0.3 | 0.1 | 100 | Recryst. 2 [1] | 105–111 | 80.3 |
| p-t.butylphenyl | 0.3 | 0.3 | 0.97 | 91.0 | Recryst. 2 [1] | 159–161 | 48.0 |
| p-Bromophenyl | 0.3 | 0.3 | 0.1 | 89.3 | Recryst. 3 [2] | 150–160 | 36.0 |
| p-Chlorophenyl | 0.5 | 0.5 | 0.15 | 89.5 | Recryst. 3 [2] | 164–165 | <54 |

[1] n-Heptane used as solvent.
[2] n-Heptane-benzene mixed solvent.

TABLE II

| | | Part 1, Activity | | | | Part 2, Stability | | | | | |
|---|---|---|---|---|---|---|---|---|---|---|---|
| | | | | | | (A) Heat Stability of Promoter Solutions Stored at 190° C. for 24 Hours. | | | | (B) U.V. Stability of Products | |
| | | | | | | | | | | Color of product | |
| Example | Triazine Promoter | Gel time, min. | Cloud time, min. | Breakaway time, min. | Percent extractibles | Gel time, min. | Cloud time, min. | Breakaway time, min. | Color of Product | After U.V. Exposure of 1.5 Hours | After U.V. Exposure of 17 Hours |
| A [1] | Triphenoxy | 4.1 | 8.5 | 13.7 | 7.1 | 3.3 | 6.6 | 15.0 | Ivory | Yellowed | Light Brown. |
| 1 | Tris-p-cresylthio | 4.0 | 8.7 | 11.2 | 7.4 | 3.1 | 6.6 | 14.3 | do | Ivory (no change). | |
| 2 | Tris-p-tert. butylphenylthio | 3.5 | 7.0 | 10.8 | 6.2 | 3.4 | 6.4 | 15.0 | do | do | |
| 3 | Tris-p-bromophenylthio | 3.7 | 7.9 | 11.1 | 8.5 | 3.5 | 6.8 | 13.6 | Lt. Brn | do | |
| 4 | Tris-p-chlorophenylthio | 3.2 | 6.3 | 7.8 | 7.2 | 3.0 | 6.5 | 14.3 | Ivory | do | Slightly yellowed. |

[1] Comparison.

The final products of the examples were solid and reproduced the interior shape of the polymerization tubes. The products, ground to pass 20 mesh on the U.S. Standard Screen Scale of Sieves, were leached with 50 volumes of boiling water for 2 hours to extract water soluble ingredients, then were vacuum dried 2 hours at 150° C./ less than 10 mm. of mercury. The percent extractible (monomer and low polymers) was determined by differences of weight before and after the hot water extraction and was as listed in Table II.

As initially formed, the products were ivory in color. Exposure to sunlight caused the product obtained using the comparison promoter, triphenoxy-s-triazine, to turn yellow; but did not affect the products obtained using the tris-mercapto promoters of this invention, similarly exposed.

The stability to light was investigated by exposing the products as removed from the polymerization tubes to light of wavelengths 366 and 254 millimicrons. These tests indicated that the effect of sunlight was due to the ultraviolet components, i.e. those with wavelengths of the order of 254 millimicrons. The light stability test results of Table II were obtained by exposing the products to ultraviolet light wavelength mostly 254 millimicrons for 1.5 hours.

The heat stability of the promoters upon being stored at about 190°–195° C. as solutions in lactam of the concentration (0.16 mol per 100 mols caprolactam) used for subsequent polymerization was tested, by storing at these temperatures for the times noted in Table II and then utilizing the stored solutions for polymerizations by the above described procedure. The observed actively, and the color of the resulting products, were as shown in Table II which demonstrates capacity of these promoters to be prepared and held in storage at relatively high temperatures, without deterioration. Such storage will sometimes be desired in commercial operations.

Example 5

A run was made using the general procedure of Examples 1–4 above, but modified as follows.

The catalyst solution was made up from ε-caprolactam and lithium hydride at double the previous strength, i.e. using 0.24 weight percent lithium hydride; and the resulting solution was mixed with 3-fold its weight of omega-laurolactam containing 0.48% by weight of tris-p-chlorophenylthio-s-triazine; and was heated in a 180° C. bath. The gel time was 1 minute. The polymer product as obtained on 15 minutes heating was a pale yellow, transparent solid polymer stable to the above described 1.5 hours of exposure to ultraviolet light and giving no objectionable odor on machining.

The suitability of the products of the examples for cutting and machining to obtain commercially useful articles from polymer rods and the like was treated. It was found that the polymers made using the chlorophenylthio compound, the bromophenylthio compound and the tertiary-butylphenylthio compound were entirely odorless even when the crude promoter was used as obtained directly from filtration and a drying step (55° C./ 1 mm. Hg). The polymer made using the p-cresylthio compound was satisfactory but would produce a faint odor upon cutting and machining. Other thio triazines, on the other hand, specifically tris-phenylthio-s-triazine, even that purified by 3 recrystallizations, lead to polymer having a very objectionable odor upon cutting or machining.

We claim:
1. Tris-(p-chlorophenylthio)-s-triazine.
2. Tris-(p-tertiary butylphenylthio)-s-triazine.
3. Tris-(p-cresylthio)-s-triazine.
4. Tris-(p-bromophenylthio)-s-triazine.

References Cited

UNITED STATES PATENTS 2,676,151  4/1954  Loughran et al. __ 260—248 XR
3,156,690  11/1964  Dexter et al. ____ 260—248 XR HENRY R. JILES, Primary Examiner JOHN M. FORD, Assistant Examiner U.S. Cl. X.R.

260—78